Dec. 22, 1925.
A. HINKELMANN
SCUFFLE HOE
Filed Oct. 1, 1923
1,566,868
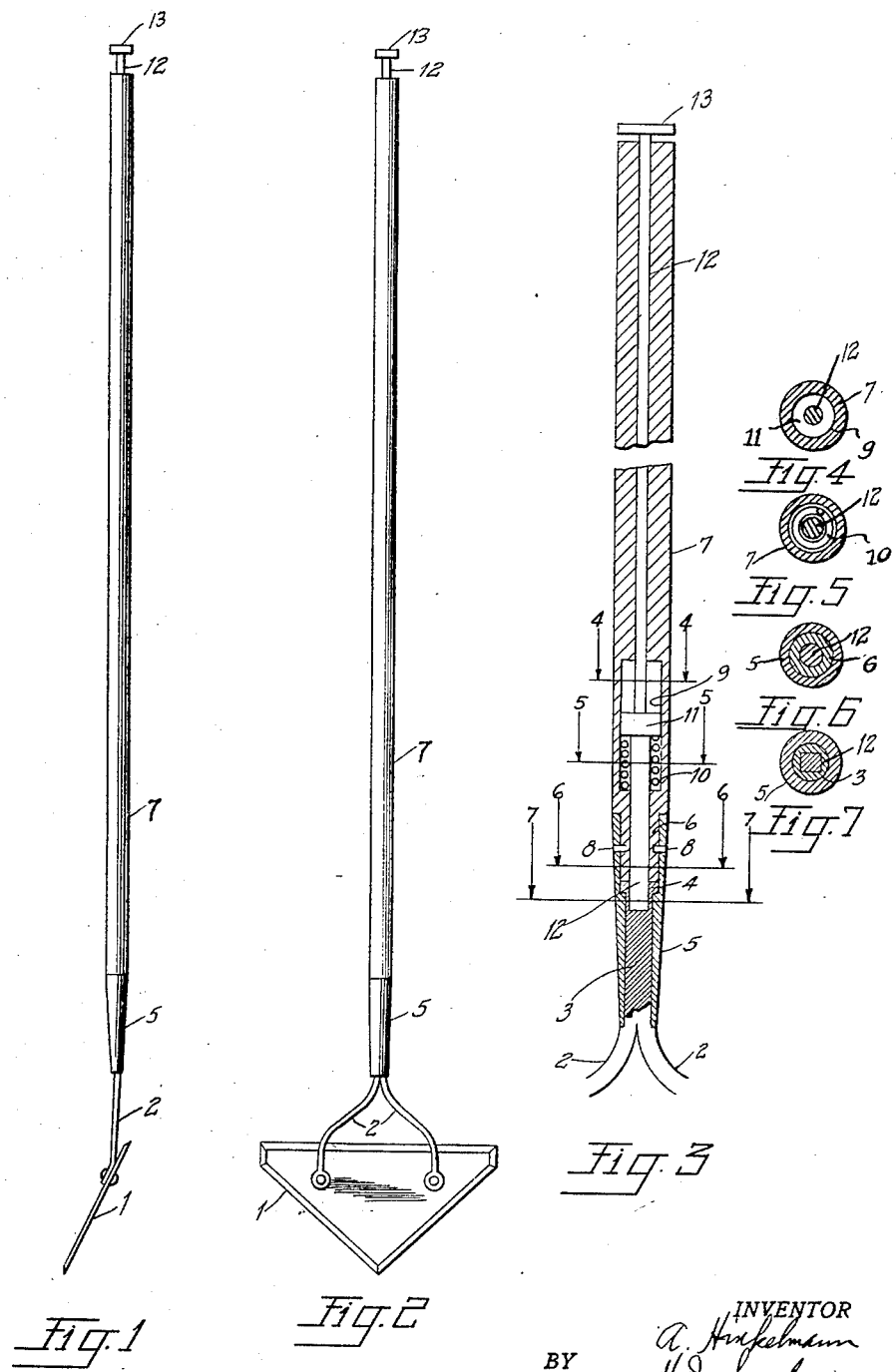

Patented Dec. 22, 1925.

1,566,868

UNITED STATES PATENT OFFICE.

AUGUST HINKELMANN, OF ELBERTA, ALABAMA.

SCUFFLE HOE.

Application filed October 1, 1923. Serial No. 665,904.

*To all whom it may concern:*

Be it known that I, AUGUST HINKELMANN, a citizen of Germany, residing at Elberta, in the county of Baldwin and State of Alabama, have invented certain new and useful Improvements in Scuffle Hoes, of which the following is a specification.

This invention relates to improvements in scuffle hoes for garden, lawn and field use. Simplicity, efficiency and durability are objects sought. With the foregoing and other objects in view the invention consists in the combination and arrangement of parts to be hereinafter fully described, pointed out in the appended claims and illustrated in the accompanying drawing which forms a part of this application and in which—

Fig. 1 is a view of the hoe in side elevation.

Fig. 2 is a face view of the same.

Fig. 3 is a longitudinal sectional view on an enlarged scale.

Figs. 4, 5, 6 and 7 are cross sectional views taken respectively on the lines 4—4, 5—5, 6—6 and 7—7 of Fig. 3.

Like reference characters denote corresponding parts throughout the several views.

The reference numeral 1 denotes the hoe blade of angular formation and having a sharp cutting edge all around. This blade is carried by the prongs 2 which unite in the core 3 which terminates in the recessed end 4 which is enlarged slightly and disposed snugly in an inner annular shoulder formed in the hollow stem 5 which stem also receives the diminished end 6 of the hollow handle 7, said stem 5 being secured by pins 8 to the handle portion 6 and the upper end of said stem abutting the annular shoulder formed in said handle by the junction of its main body portion and diminished end. The handle is formed with the longitudinally extending enlarged recess 9 wherein an expansion coil spring 10 is disposed, one end of said spring resting upon the shoulder formed at the base of the enlarged portion of said recess and the opposite end of said spring engaging a collar 11 arranged upon a plunger rod 12 extending entirely through the hollow portion of said handle, centrally through the spring 10, and being adapted for removable disposal in the square cavity formed in the end of the core 3, said rod 12 at its lower end being square in cross section so that the core may be rotated therewith.

The rod 12 beyond the handle 7 is provided with the hand piece 13 by means of which it may be depressed or rotated. The handle is of two-piece formation so that the tool can be assembled. In use the tool is normally operated by means of its handle 7, the spring 10 yieldingly retaining the end of the rod 12 out of engagement with the core 3. In this way the blade is used to cut shrubbery, roots and the like. When it is desired to rotate the blade rapidly to cut small pits in the earth or, in this manner, to cut twigs, roots or the like without rotating the handle 7 the rod 12 is depressed into the position shown in Fig. 3 and then rotated. This means of rotating the blade 1 will be found more effectual and greater leverage will be obtained than would be possible by merely turning the handle 7 by hand.

What is claimed is:—

1. In a scuffle hoe, a cutting blade, a core connected to said blade, a stem receiving said core, a handle connected to said stem, a longitudinally movable rotary rod extending through said handle and normally into said core whereby rotation of the same is effected, and means for yieldingly retaining said rod and core in separate relation.

2. In a scuffle hoe, a cutting blade, a core having a recessed end and connection with said blade, a stem receiving said core, a handle secured to said stem and abutting the recessed end of said core, said handle being formed with an enlarged cavity, a spring within said cavity, a rod extending longitudinally of said sleeve and removably into the recessed end of said core whereby rotation of the same is effected, a hand piece for said rod, and a collar arranged upon said rod within the cavity in said handle and abutting one end of said spring.

In testimony that I claim the foregoing as my own I have hereto affixed my signature.

AUGUST HINKELMANN.